United States Patent
Okubo

(10) Patent No.: US 9,750,072 B2
(45) Date of Patent: Aug. 29, 2017

(54) MOBILE DEVICE AND COMMUNICATION CONTROL METHOD

(71) Applicant: CANON KABUSHIKI KAISHA, Tokyo (JP)

(72) Inventor: Yuzuru Okubo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/340,677

(22) Filed: Jul. 25, 2014

(65) Prior Publication Data

US 2015/0044988 A1 Feb. 12, 2015

(30) Foreign Application Priority Data

Aug. 8, 2013 (JP) .................... 2013-165588

(51) Int. Cl.
*H04L 29/06* (2006.01)
*H04W 76/02* (2009.01)
(Continued)

(52) U.S. Cl.
CPC ....... *H04W 76/026* (2013.01); *H04L 12/1432* (2013.01); *H04L 12/1467* (2013.01); *H04W 4/005* (2013.01); *H04W 4/26* (2013.01); *H04M 15/28* (2013.01); *H04M 15/55* (2013.01); *H04M 15/60* (2013.01); *H04W 4/24* (2013.01); *H04W 76/064* (2013.01)

(58) Field of Classification Search
USPC .................................... 709/231, 238, 250
See application file for complete search history.

(56) References Cited

U.S. PATENT DOCUMENTS 7,116,682 B1 * 10/2006 Waclawsky ........... H04J 3/1682
370/468
7,310,694 B2 * 12/2007 Han .................... H04L 12/6418
358/426.01
(Continued)

FOREIGN PATENT DOCUMENTS

CN 102571756 A 7/2012
JP 2007-281731 A 10/2007
(Continued)

OTHER PUBLICATIONS

RFC 793: Transmission Control Protocol, DARPA Internet Program Protocol Specification, (http://www.iettorg/rfc/rfc793.txt., Sep. 1981, pp. 1-152.
(Continued)

*Primary Examiner* — Vladimir Magloire
*Assistant Examiner* — Majid Syed
(74) *Attorney, Agent, or Firm* — Carter, DeLuca, Farrell & Schmidt, LLP

(57) ABSTRACT

Determining an initial number of TCP connections, dynamically determining increases and decreases in the number of TCP connections, and so on depending on a wireless communication method that is used enables a plurality of TCP connections to be used for wireless communication methods having higher communication bandwidths, and can thus improve communication speeds. Meanwhile, a drop in communication speed can be suppressed when using wireless communication methods having lower communication bandwidths.

14 Claims, 13 Drawing Sheets

(51) Int. Cl.
*H04W 4/00* (2009.01)
*H04W 4/26* (2009.01)
*H04L 12/14* (2006.01)
*H04M 15/28* (2006.01)
*H04M 15/00* (2006.01)
*H04W 4/24* (2009.01)
*H04W 76/06* (2009.01)

(56) References Cited

U.S. PATENT DOCUMENTS

| | | | |
|---|---|---|---|
| 8,116,811 B2* | 2/2012 | Kobayashi | H04W 28/18 455/552.1 |
| 8,380,217 B2* | 2/2013 | Caldwell | H04W 48/06 370/252 |
| 8,806,030 B2* | 8/2014 | Zhu | H04L 67/141 709/228 |
| 2003/0073406 A1* | 4/2003 | Benjamin | G08G 1/0962 455/41.1 |
| 2005/0044250 A1 | 2/2005 | Gay et al. | |
| 2011/0093605 A1 | 4/2011 | Choudhury et al. | |
| 2011/0249553 A1 | 10/2011 | Wang et al. | |
| 2011/0314129 A1 | 12/2011 | Rezaiifar et al. | |
| 2012/0144019 A1 | 6/2012 | Zhu et al. | |
| 2012/0198079 A1 | 8/2012 | Spink | |
| 2013/0013791 A1 | 1/2013 | Kotecha et al. | |
| 2014/0066074 A1* | 3/2014 | Folke | H04W 36/08 455/437 |
| 2014/0126469 A1* | 5/2014 | Youtz | H04W 48/02 370/328 |

FOREIGN PATENT DOCUMENTS

| | | |
|---|---|---|
| JP | 2009-246875 A | 10/2009 |
| JP | 2010-067015 A | 3/2010 |
| JP | 2010-172044 A | 8/2010 |
| JP | 2011-223137 A | 11/2011 |
| JP | 2012-029259 A | 2/2012 |
| WO | 97/23073 A1 | 6/1997 |
| WO | 2013/044489 A1 | 4/2013 |

OTHER PUBLICATIONS

Great Britain Search Report issued in corresponding application No. 1413296.3 on Dec. 1, 2014.
German Office Action issued in corresponding application No. 102014215508.8 on Feb. 1, 2017.
Japanese office action issued in corresponding application No. 2013165588 on Apr. 17, 2017.
Chinese office action issued in corresponding application No. 201410383528.1 dated May 22, 2017.

* cited by examiner

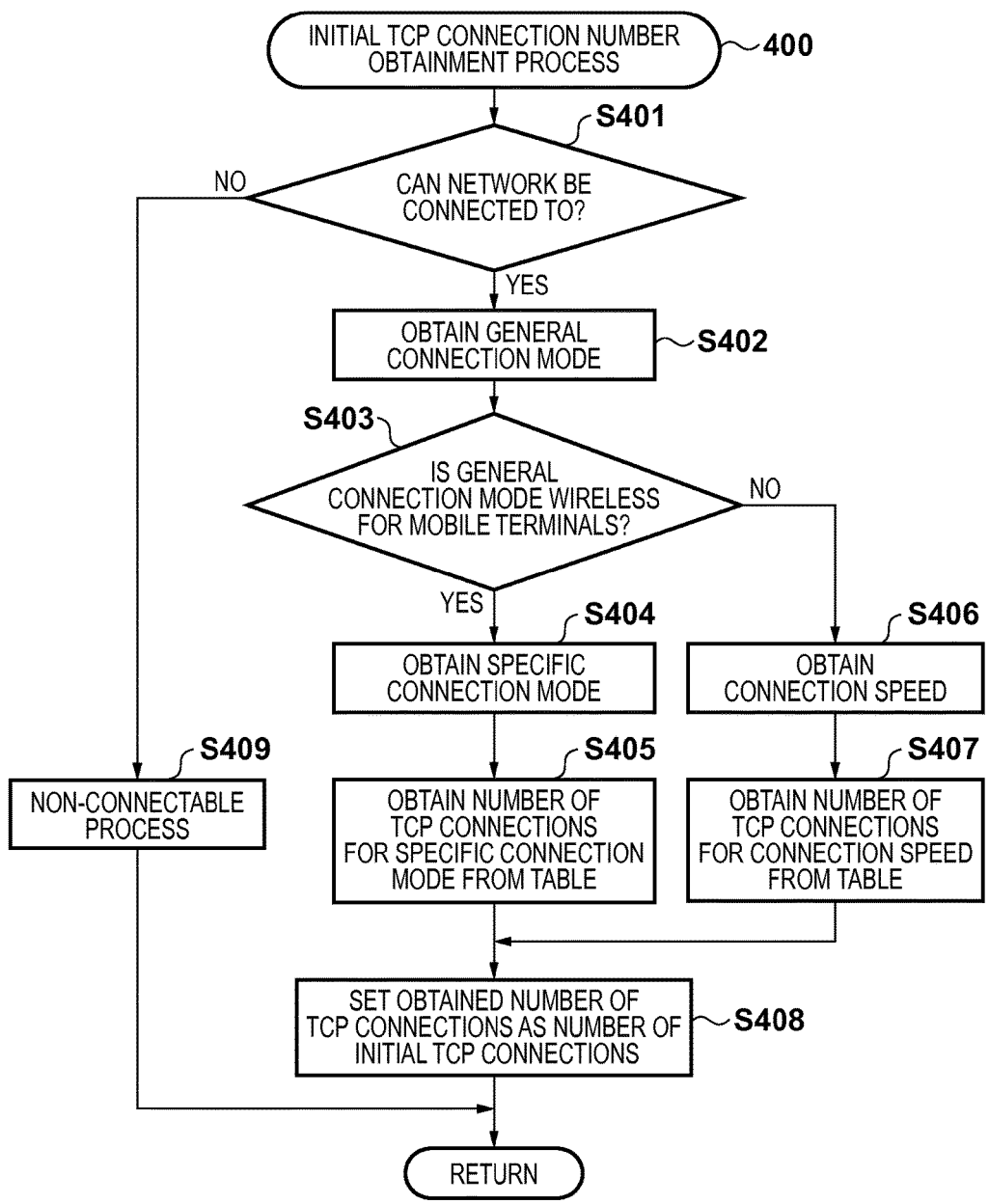

FIG. 5A

| EXTERNAL NETWORK | NUMBER OF TCP CONNECTIONS |
|---|---|
| Unknown | 1 |
| GSM | 1 |
| GPRS | 1 |
| W-CDMA | 1 |
| EDGE | 1 |
| HSDPA | 2 |
| HSPA+ | 4 |
| LTE | 8 |

FIG. 5B

| CONNECTION SPEED | NUMBER OF TCP CONNECTIONS |
|---|---|
| 10Mbps | 1 |
| 20Mbps | 2 |
| 40Mbps | 4 |
| 80Mbps | 8 |
| 160Mbps | 16 |
| 320Mbps | 24 |
| 640Mbps | 32 |

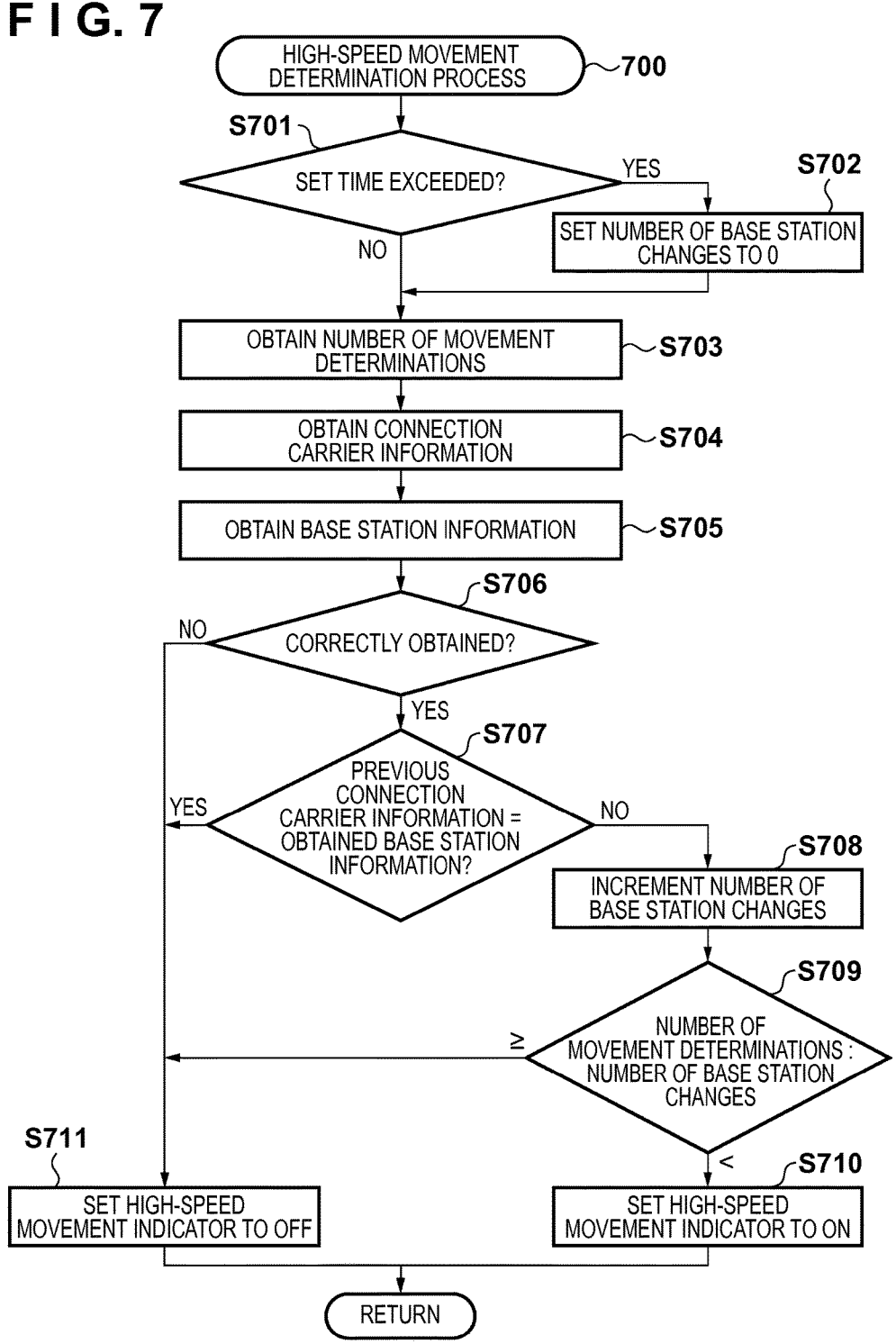

F I G. 14
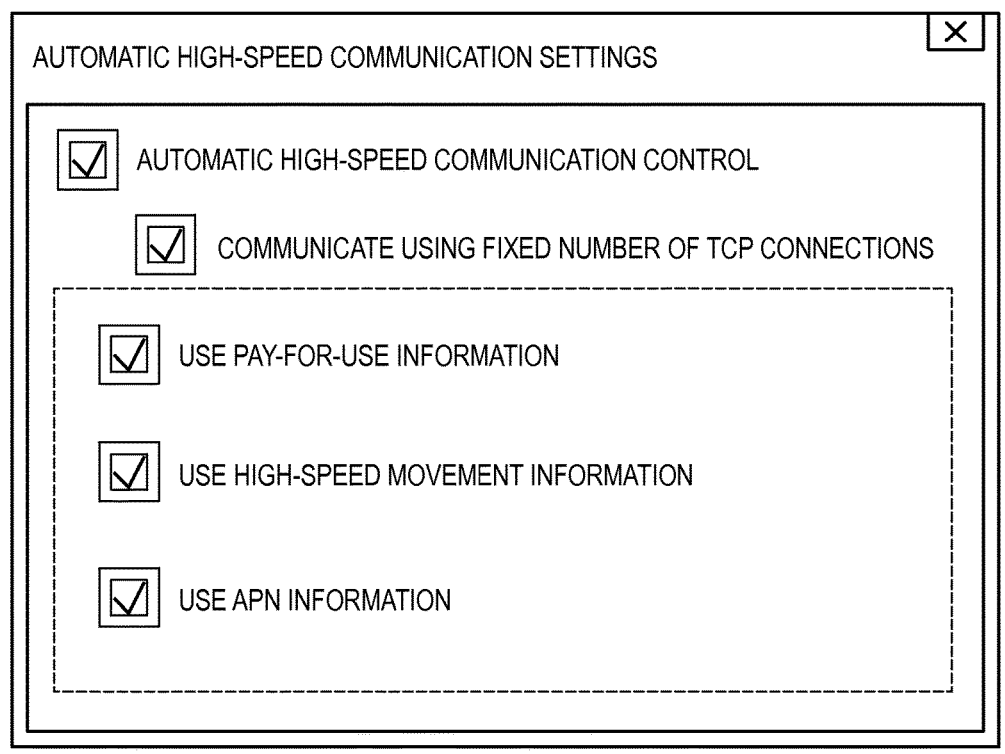

MOBILE DEVICE AND COMMUNICATION CONTROL METHOD

BACKGROUND OF THE INVENTION

Field of the Invention

The present invention relates to mobile devices such as mobile terminals and to communication control methods for such devices sending and receiving information using a plurality of TCP connections.

Description of the Related Art

Transmission Control Protocol (TCP) is known as a typical protocol used for communication that demands reliability, such as the sending and receiving of files (see RFC 793: Transmission Control Protocol (http://www.ietf.org/rfc/rfc793.txt)). Using a plurality of TCP connections is one method for increasing the speed of communication. This method typically divides the data to be sent into a plurality of pieces and sends the pieces in parallel over a plurality of TCP connections. This method is known as being highly effective in cases where the physical communication channel between information terminals has sufficient bandwidth. Such use is also being considered in wireless environments (see Japanese Patent Laid-Open No. 2010-67015).

Such a method of using a plurality of TCP connections can be considered effective, with no major disadvantages, when the communication environment is stable and the information device is a standard device that does not run on batteries. However, the communication speeds become unstable for wireless information terminals, due to the terminals typically being several kilometers or more away from a base station, frequently switching between base stations that are in range when the terminal is moving at high speeds, the terminal receiving weak signals within buildings, and so on. Accordingly, a method that uses a plurality of TCP connections has been problematic in that such a method is not simply ineffective, but that in some cases, using a single TCP connection actually provides higher communication speeds.

There is a further problem in that mobile terminals run on batteries, and a method that uses a plurality of TCP connections employs a plurality of CPU cores, which can affect the time for which the terminal can be run.

SUMMARY OF THE INVENTION

It is an object of embodiments of the invention to address one or more of the forgoing concerns.

According to one aspect of the present invention there is provided a mobile device that establishes communication with a partner apparatus through wireless communication with a base station, the device comprising: a holding unit which holds a correspondence table in which wireless communication connection modes that can be used by the mobile device are associated with corresponding numbers of connections with the partner apparatus; a specifying unit which specifies a current wireless communication connection mode of the mobile device; a setting unit which sets the number of connections corresponding to the wireless communication connection mode specified by the specifying unit, based on the correspondence table; and a communicating unit which carries out communication with the partner apparatus using the number of connections set by the setting unit.

According to embodiments of the present invention, a drop in communication speed can be suppressed by determining a data transfer method in consideration of communication overhead when a plurality of TCP connections are employed. The amount of energy consumed can also be suppressed.

Further preferred features of the present invention will become apparent from the following description of exemplary embodiments with reference to the attached drawings.

BRIEF DESCRIPTION OF THE DRAWINGS

FIG. 4 is a flowchart illustrating a process for obtaining an initial number of TCP connections performed by a control unit.

FIGS. 5A and 5B are tables used for determining a number of TCP connections.

FIG. 7 is a flowchart illustrating a determination process performed by a control unit during high-speed movement.

FIG. 14 is a diagram illustrating a screen for inquiring with the user whether or not to allow the use of communication using a plurality of TCP connections.

DESCRIPTION OF THE EMBODIMENTS

Various terms used throughout this specification will be defined before describing exemplary embodiments. A "socket" is a notation for identifying and classifying TCP layer communication channels. IP protocol is typically used as a lower layer, and in such a case, the socket is a combination of an IP address and a TCP port number. A "TCP connection" refers to a single communication channel in the TCP layer. Specifically, this is a combination of a receiving-side socket and a sending-side socket. "Receive window size" is a receiving buffer in the TCP protocol. "Send window size" is a sending buffer in the TCP protocol. TCP can prevent buffer overflow by notifying a sender of the remaining receive window size. TCP can also attempt to improve communication speeds by gradually increasing the send window size. Because simply increasing the send window size leads to communication channel congestion, it is necessary to employ a congestion control algorithm that controls these window sizes. Tahoe, Reno, and so on can be given as well-known congestion control algorithms.

In this specification, a "session" refers to an aggregation of one or more TCP connections. The session is an aggregation of a plurality of TCP connections used when dividing a file and sending and receiving that file.

First Embodiment

Apparatus Configuration

Figure 2:
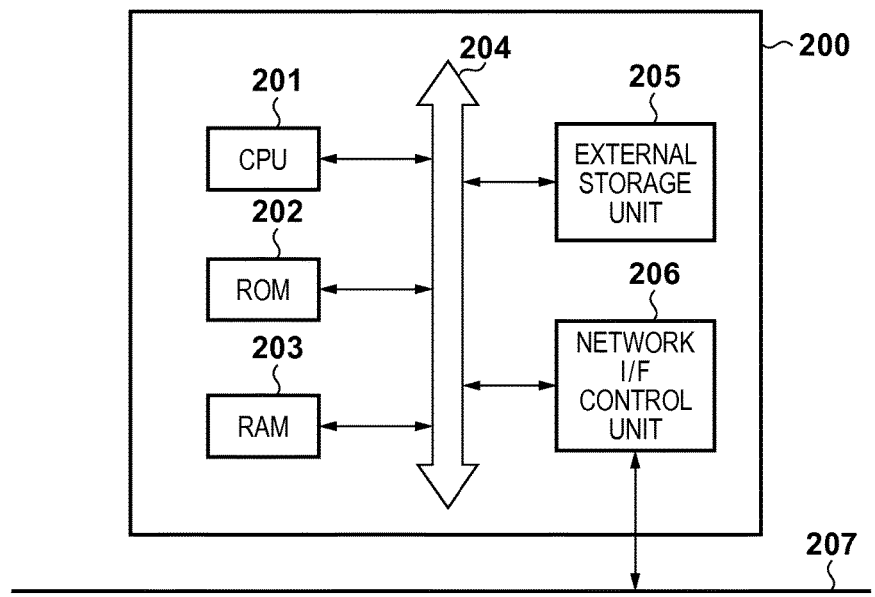
FIG. 2 is a block diagram illustrating an example of the configuration of a system including a computer, according to an embodiment.

A computer that implements a communication control method according to this embodiment will be described as an example of an information processing apparatus embodying the present invention. FIG. 2 is a block diagram illustrating the configuration of the computer according to the present embodiment. It goes without saying that unless otherwise specified, the present invention can be applied in a standalone device or a system configured of a plurality of devices, as long as the functions of the present invention are executed. Furthermore, it goes without saying that unless otherwise specified, the present invention can be applied in any system that carries out processing via connections in networks such as a LAN, a WAN, a WWAN, the Internet, and so on, as long as the functions of the present invention are executed.

Figure 1:
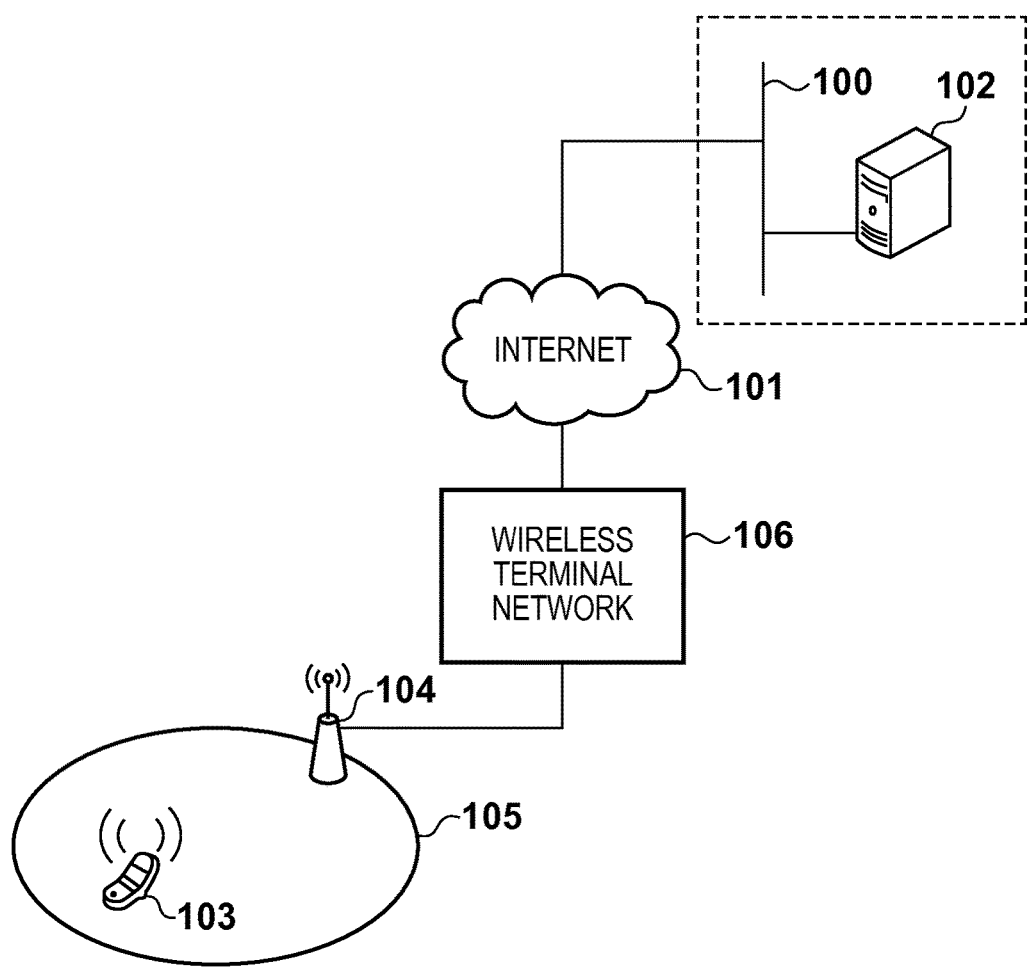
FIG. 1 is a diagram illustrating an example of the configuration of a network including a computer, according to an embodiment.

In FIG. 2, a computer 200 is a client computer 103 or a server computer 102 (FIG. 1). The computer 200 includes a CPU 201 that executes processing in which graphics, images, text, tables (including spreadsheets), and so on are intermixed, based on a text processing program and the like stored in a program ROM within a ROM 202 or in an external storage unit 205. The CPU 201 furthermore carries out overall control of respective devices connected to a system bus 204. Additional input/output units may be provided as well.

Although a wireless or wired connection may be established between the client computer 103 and the server computer 102, the present embodiment assumes that the client computer 103 is connected to a wireless communication network (in other words, a communication partner apparatus such as a server). The client computer 103 may also be referred to as a "client", a "wireless terminal", a "wireless information terminal", a "mobile device", or the like.

An operating system, which is a control program for the CPU 201, and so on are also stored in the program ROM within the ROM 202 or in the external storage unit 205. Various types of data are stored in a data ROM within the ROM 202 or in the external storage unit 205.

A RAM 203 functions as a main memory, a work area, and so on for the CPU 201, whereas a network I/F control unit 206 controls the sending and receiving of data to and from a LAN 207.

In FIG. 1, a network 100 is a communication line for exchanging information between the aforementioned apparatuses. Internet 101 is a communication line for exchanging information between the aforementioned devices around a firewall. The network I/F control unit 206 may be a wireless communication unit. In other words, a wireless antenna, a device for controlling the antenna, and so on may be provided. The network 100 and the Internet 101 are communication line networks that support the TCP/IP protocol, for example. In FIG. 1, a server computer group 102 is indicated as being a single server, but may also be configured of a plurality of server computers. The server computer group 102 may also be configured of a virtual PC. Furthermore, a wireless base station 104 and a wireless information terminal 103 that can connect thereto when within a wireless connection coverage area 105 of the wireless base station 104 may be configured of computers, and may communicate over an independent wireless terminal network 106.

Software Configuration

Figure 3:
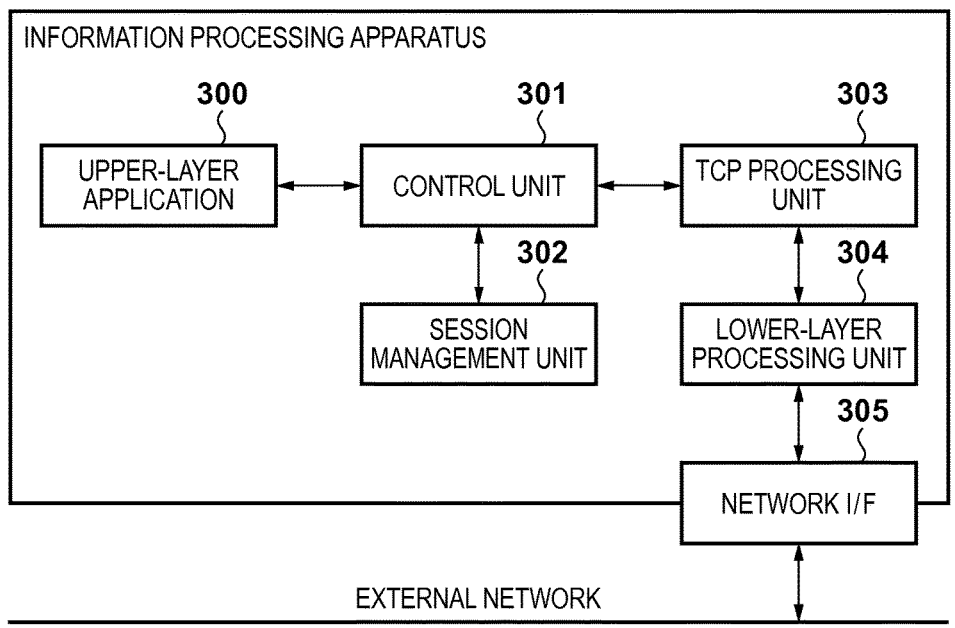
FIG. 3 is a diagram illustrating an example of a software configuration, according to an embodiment.

Next, a system block diagram according to the present embodiment will be described. FIG. 3 illustrates software modules in a communication function provided in computers such as the client computer 103. The respective processing units shown in FIG. 3, aside from the communication line (external network), are stored in the ROM 202, the RAM 203, or the external storage unit 205 of the client computer, and the processes thereof are executed by the CPU 201.

It is necessary for the client 103 and the server 102 to have mechanisms for managing the transfer of data, and specifically, mechanisms for managing whether or not to communicate using a plurality of connections. Many of these mechanisms can be standardized, and the full effect can be achieved by carrying out the present invention in both the server and the client, while half the effect can be achieved by carrying out the present invention in one of the server and the client. Here, a method of carrying out the present invention in both the server and the client, rather than in one or the other, will be described.

FIG. 3 illustrates the software configuration. Any scheme may be employed for the management mechanism up to the TCP layer as long as it is RFC 793-compliant and provides a usable API. In other words, there is no particular limitation on how a TCP processing unit 303 and a lower-layer processing unit 304 are implemented as long as the units provide an appropriate API. In many cases, the TCP processing unit 303 and the lower-layer processing unit 304 are provided by the operating system, but the management mechanisms required by the present invention may be provided as standalone entities as well. Methods for realizing such a system are well-known and will thus not be described in detail here.

A control unit 301 manages sending and receiving processes for a plurality of TCP connections. The control unit 301 provides an interface for an upper-layer application 300, and also manages the sending and receiving of data to and from lower layers. The control unit 301 may offload TCP connection processing to a session management unit 302 rather than performing all of the processing itself.

Although the control unit 301 and the session management unit 302 are written as a single software library in the present embodiment, the functions thereof may be provided directly in the operating system, or may be implemented by the network I/F hardware. In other words, where the functions are implemented is not particularly limited as long as equivalent functions and interfaces can be provided to the upper-layer application 300.

The control unit 301 and the session management unit 302 manage sessions in which a plurality of TCP connections are grouped together. Specifically, these units manage the connection, acceptance, sending and receiving, and so on of TCP connections, and notify the upper-layer application 300 of the results thereof. The session management unit 302 also manages communication using a plurality of TCP connections. A method of communicating using a plurality of TCP connections is a well-known technique and will thus not be described in detail in the present embodiment. For example, the method may divide a file equally among a fixed number of TCP connections based on the file size, may dynamically increase or decrease the number of TCP connections based on the communication conditions, may allow a user to assign the number of TCP connections, or the like.

Data Transfer Procedure

Next, a data transfer method, or in other words, the sending and receiving of data according to the present embodiment, will be described. FIG. 4 illustrates a flow of processing performed when communication is started. Upon accepting a request to start communication from the upper-layer application 300, the control unit 301 determines the initial number of TCP connections in an initial TCP connection number obtainment process 400, shown in FIG. 4. In the initial TCP connection number obtainment process 400, first, in S401, it is determined whether or not a network can be connected to. In the case where it is determined that the network cannot be connected to for some reason, a connection error is issued to the upper-layer application 300 in a non-connectable process (S409). In the case where it is determined that a connection can be made, the process advances to S402. A general connection mode is obtained in S402. A connection mode such as Wi-Fi, wired LAN, wireless communication for a mobile terminal, or the like is obtained here.

After obtaining the general connection mode, it is determined in S403 whether the mode is wireless communication for a mobile terminal, in order to specify the connection mode in detail. Here, "wireless communication for a mobile terminal" indicates wireless communication assuming primarily mobile devices, and thus indicates a communication method (or communication standard) for mobile telephones, for example. For example, this refers to a communication method that aims to enable an information terminal to communicate continuously even if the information terminal has moved quickly and across a wide range. Meanwhile, wireless communication that is not for mobile terminals refers primarily to a communication method for terminals that do not move and whose positions are therefore fixed. In this example, Wi-Fi (wireless LAN) is considered to be a form of wireless communication that is not for mobile terminals.

In the case where the communication method is not wireless communication for a mobile terminal, the process advances to S406. In S406, a connection speed for the current connection mode is obtained. Although these descriptions primarily assume a Wi-Fi connection, the branch at S403 may be divided further in the case where other connection modes such as wired LAN are to be taken into consideration as well. The number of TCP connections is obtained in accordance with the connection speed obtained in S407. In the present embodiment, the initial number of TCP connections is determined using the correspondence table shown in FIG. 5B, or in other words, using a table indicating numbers of TCP connections for corresponding connection speeds. The method for determining the initial number of TCP connections is not limited thereto, however. For example, an equation for indexing the number of TCP connections for connection speeds may be prepared, or a calculation means may be prepared in an external network. After obtaining the number of TCP connections in S407, the obtained number of TCP connections is set as the initial number of TCP connections to be used in communication in S408, after which the procedure moves to a connection process.

In the case where it is determined in S403 that the communication method is wireless communication for a mobile terminal, the procedure moves to S404. In S404, the control unit 301 obtains the specific connection mode. Here, the "specific connection mode" refers to the wireless standard for the mobile terminal, and refers specifically to GSM (registered trademark), WCDMA (registered trademark), or the like. After obtaining the specific connection mode, in S405, the control unit 301 obtains the number of TCP connections corresponding to the specific connection mode. In the present embodiment, the initial number of TCP connections is determined using the correspondence table shown in FIG. 5A, or in other words, using a table indicating numbers of TCP connections for specific connection modes. After obtaining the number of TCP connections in S405, the TCP connection number is set as the initial number of TCP connections to be used in communication in S408, after which the procedure moves to a connection process. The actual connection process itself, sending and receiving processes, ending processes, and the like are also necessary, in addition to the initial TCP connection number obtainment process 400. However, these processes are well-known as techniques for sending and receiving data using a plurality of TCP connections, and as such are not necessary for describing the characteristics of the present invention; thus details thereof will be omitted here. The correspondence tables illustrated in FIGS. 5A and 5B are held in the ROM 202, the RAM 203, or the like, for example.

According to the present embodiment as described thus far, determining the initial number of TCP connections, and dynamically determining increased number or decreased number of TCP connections depending on the wireless communication method that is used enables a plurality of TCP connections to be used for wireless communication methods having higher communication bandwidths, and can thus improve communication speeds. Meanwhile, a drop in communication speed can be suppressed when using wireless communication methods having lower communication bandwidths. Furthermore, the amount of power consumed can be suppressed by suppressing the use of multiple CPU resources to the greatest extent possible.

Figure 6A:
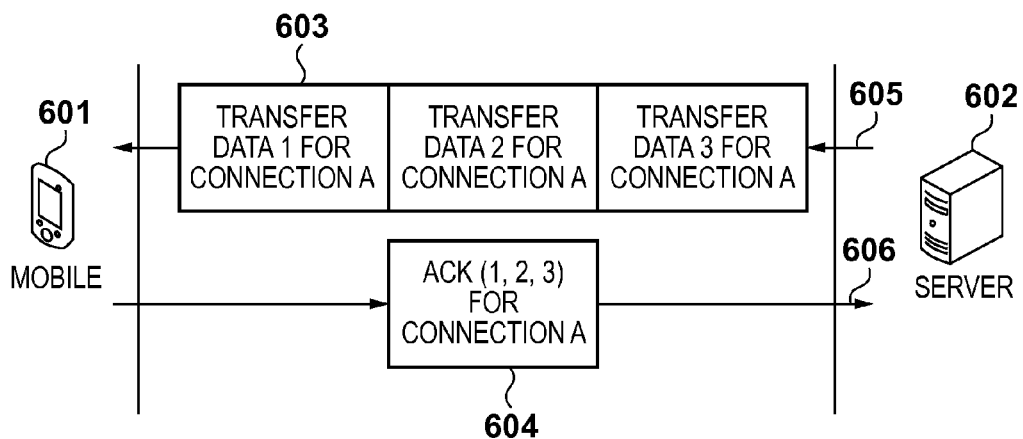
FIGS. 6A and 6B are diagrams illustrating communication using a plurality of TCP connections in a low-bandwidth environment.
Figure 6B:
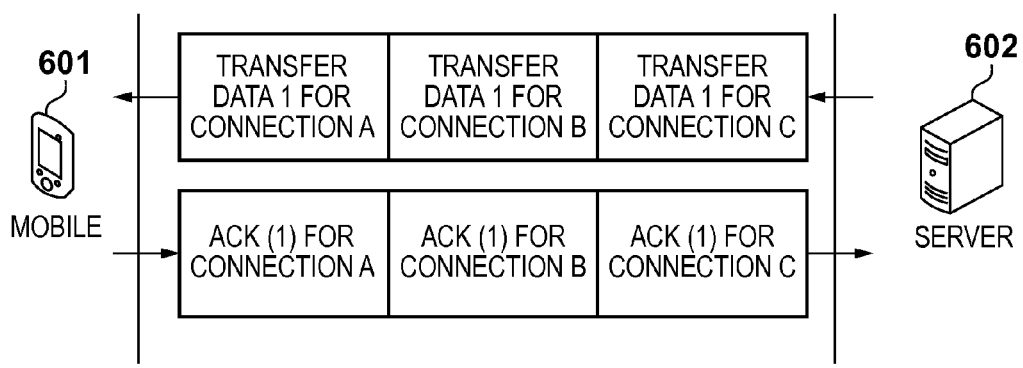

Additional brief descriptions of the reasons why speeds decrease when a large amount of TCP connections are established over a line having low communication bandwidth will be given hereinafter. This phenomenon manifests in different ways depending on the congestion control algorithms used in the client and the server, respectively. Accordingly, it is not necessarily the case that the specific phenomenon described here will always occur. A situation in which a wireless information terminal 601 receives some sort of content from the server 602 will be considered, with reference to FIG. 6A. FIG. 6A illustrates a case where a technique employing a plurality of TCP connections is not used, and the content is received over a single TCP connection. On the other hand, FIG. 6B illustrates a case where a technique employing a plurality of TCP connections is used, and the content is received over three TCP connections. A block 603 indicates a single TCP packet. A line 605 indicates a receiving line and a line 606 indicates a sending line, as viewed from the wireless information terminal 601. In TCP, the receiving side responds to the server side with a remaining buffer capacity as well as how much data has been received, so that the receiving side buffer does not overflow. The response packet is an ACK (ACKnowledgment) packet 604. This ACK packet 604 is a control signal that does not contain data to be sent or received. Accordingly, an increase in ACK packets 604 will lead to an increase in the communication overhead. Here, the numbers attached to the ACK packets 604 indicate which packet of the transfer data the response 604 is being made to. In FIG. 6A, the same connection is used, and thus the three received packets can be responded to with a single ACK packet. On the other hand, in FIG. 6B, different connections are used, and thus a single ACK packet cannot be used for the response, resulting in the number of ACK packets increasing by that amount. Of course, if data is being sent and received successfully over the individual TCP connections, a single TCP packet can be sent if the congestion algorithm in the server 602 sufficiently increases the send window size of the server 602, even for the situation illustrated in FIG. 6B. However, in the case where the communication bandwidth is low, ACKs will be delayed in a given single TCP connection due to the influence of other TCP connections. The congestion algorithm in the server will likely determine that the line is congested by that amount as a result. In such a case, the send window size in the server 602 decreases, leading to a reduction in the ACK packet interval. Thus an increase in ACK packets is expected in the case where a large amount of TCP connections are established over a line that has an effectively low communication bandwidth.

Note that in the case where a communication medium having asymmetrical upload and download speeds is used, the number of connections is set in accordance with the connection speed in the direction in which the data is being transferred.

Second Embodiment

The first embodiment describes a method in which the control unit 301 determines the number of TCP connections based on the general connection mode and the specific connection mode. The present embodiment enables the number of TCP connections to be determined more dynamically for wireless information terminals moving at high speeds.

Referring to FIG. 7, a method for determining an initial number of TCP connections based on whether or not a wireless information terminal is moving at high speeds according to the present embodiment will be described. In the present embodiment, a high-speed movement determination process, illustrated in FIG. 7, actively obtains information of a base station. However, the following processing may be carried out using a notification from the operating system, a baseband chip, or the like as a trigger.

The control unit 301 corrects the initial number of TCP connections based on a high-speed movement determination process 700. In S701 of the high-speed movement determination process 700, the control unit 301 determines whether or not a determination timer that has been set in advance has exceeded a set time. In the case where the set time has been exceeded, the number of base station changes and the determination timer are set to 0 in S702. Then, in S703, the control unit 301 obtains a number of determinations during movement. The number of determinations during movement may be prepared in advance as a constant, or may be increased/decreased dynamically. The number of determinations during movement is compared with a number of times a base station within range has changed during the set amount of time (that is, a number of horizontal handovers), and is used as a threshold for determining high-speed movement in the case where the number of horizontal handovers has exceeded the number of determinations during movement. In S704, the control unit 301 obtains connection carrier information. Although "connection carrier information" refers specifically to an MNC (mobile network code), an MCC (mobile country code), or the like, other parameters required for the determination may be obtained.

In S705, the control unit 301 obtains base station information. Although "base station information" refers to a CellID (base station ID), an LAC (location area code), or the like, other parameters required for the determination may be obtained. In S706, it is determined whether the connection carrier information and the base station information have been correctly obtained. The procedure moves to S707 in the case where the information has been correctly obtained. In the case where the information has not been correctly obtained, the procedure moves to S711, where it is determined that the terminal is not moving at a high speed and the process ends.

In S707, the previous connection information is compared with the connection information currently obtained. Here, "connection information" refers to a set including the connection carrier information and the base station information. In the case where the connection information matches, it is determined that the terminal is not moving at a high speed, and the procedure moves to S711. However, in the case where the connection information does not match, the procedure moves to S708, where the control unit 301 increments the number of base station changes. In S709, the number of determinations during movement, or in other words, the threshold, is compared with the number of base station changes; the procedure moves to S711 in the case where the number of determinations during movement is greater than the number of base station changes, and moves to S710 in the case where the number of base station changes greater than the number of determinations during movement. In S710, the control unit 301 determines that the terminal is moving at a high speed, and the process ends.

Figure 8:
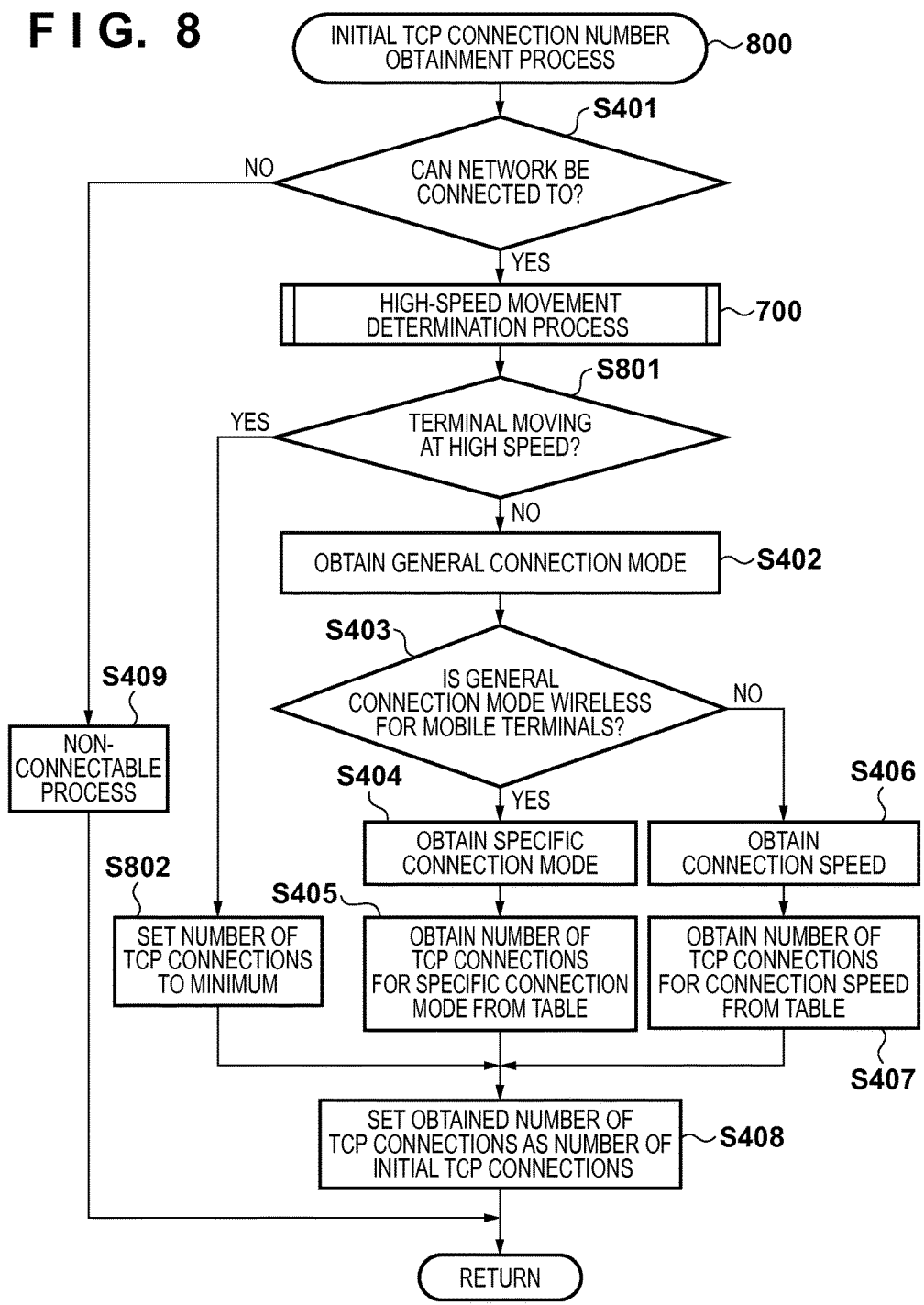
FIG. 8 is a flowchart illustrating a process for obtaining an initial number of TCP connections performed by a control unit using a determination process during high-speed movement.

A method for using the high-speed movement determination process 700 will be described with reference to FIG. 8. An initial TCP connection number obtainment process 800 shown in FIG. 8 is an expanded version of the initial TCP connection number obtainment process 400 shown in FIG. 4. The same processes as those carried out in the initial TCP connection number obtainment process 400 have already been described in the first embodiment, and do not express characteristics of the present embodiment; details thereof will therefore be omitted. In the initial TCP connection number obtainment process 800, after it has been determined in S401 whether or not the network can be connected to, it is then determined whether or not the terminal is moving at a high speed, using the high-speed movement determination process 700.

The procedure moves to S802 if the control unit 301 determines in S801 that the terminal is moving at a high speed, and moves to S402 if the control unit 301 determines that the terminal is not moving at a high speed. In the case where it is determined that a sufficient communication speed is not being attained, in S802, the control unit 301 sets the number of TCP connections to a minimum. Here, the "minimum number of TCP connections" is considered to generally be 1, but may be determined as desired based on the capabilities of the wireless information terminal, the communication network, or the like, and may be changed dynamically. Regardless, the minimum number of TCP connections is a lower number than the number of TCP connections determined in S405 or S407. Note that if it is assumed that the determination process 700 is carried out only for mobile terminal wireless, where the connection mode is a mode for mobile telephones, for example, the determination process 700 may be carried out between S403 and S404 in FIG. 8.

According to the present embodiment as described thus far, it is determined whether or not the wireless information terminal is moving at a high speed, and if the terminal is moving in a high-speed, it is predicted that the communication speed will drop; thus by suppressing the number of TCP connections, the communication overhead for a plurality of TCP connections can be reduced, and the communication speed can be maintained. Thus, in the case where the terminal is moving at a high speed and the effective bandwidth used for data transfer will drop as a result, a drop in the communication speed can be prevented by setting the number of connections to a number lower than a number for wireless communication connection modes, such as to 1, for example.

Third Embodiment

The first embodiment describes a method in which the control unit 301 determines the TCP connection number based on the general connection mode and the specific connection mode. The following describes an embodiment capable of more dynamically handling the use of pay-for-use communication plans, end users whose communication data amounts are capped, and so on.

Figure 9:
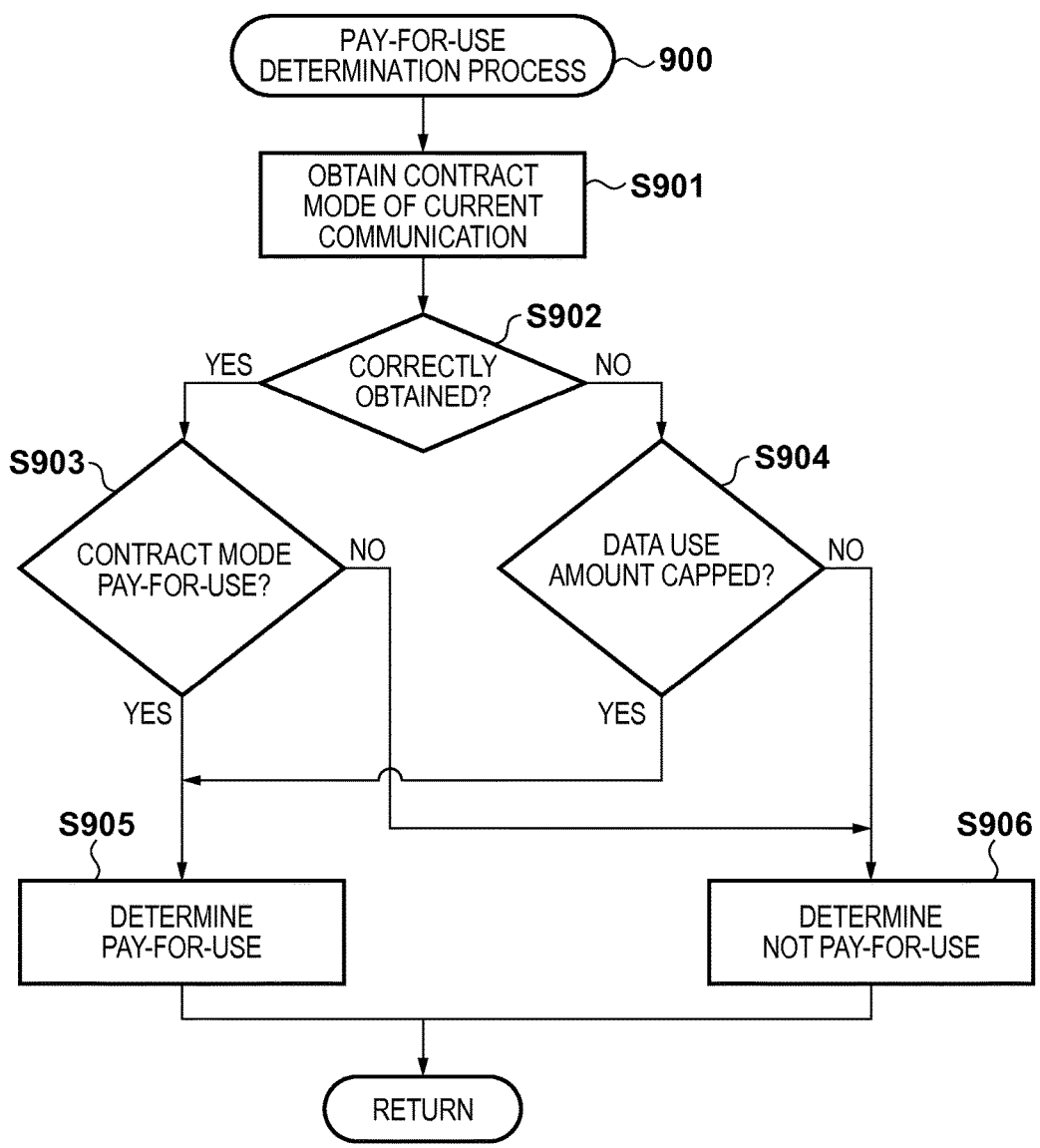
FIG. 9 is a flowchart illustrating a pay-for-use determination process performed by a control unit.

Referring to FIG. 9, a method for determining an initial number of TCP connections based on whether or not a pay-for-use plan is being used according to the present embodiment will be described. The control unit 301 corrects and limits the initial number of TCP connections based on a pay-for-use determination process 900.

First, in S901, the control unit 301 obtains contract information, and particularly contract information indicating a contract for charging a fee, for the communication being carried out. The "contract information" indicates whether the contract is pay-for-use (i.e., metered rate) or flat-rate. Next, in S902, the control unit 301 determines whether or not the information has been correctly obtained, and the procedure moves to S903 in the case where the contract information has been correctly obtained.

In the case where the contract information indicates pay-for-use in S903, the procedure moves to S905, whereas in the case where the contract information does not indicate pay-for-use, the procedure moves to S906. In S905, it is determined that the communication is pay-for-use, and the process ends. In S906, it is determined that the communication is not pay-for-use, and the process ends. Of course, the results of the determinations in S905 and S906 are recorded. On the other hand, in the case where the contract information was not correctly obtained in S902, the procedure advances to S904.

In S904, the control unit 301 determines whether or not the amount of data that can be used by an end-user is capped. The procedure moves to S905 in the case where it is determined that the amount of data that can be used is capped. In the present embodiment, the same processing as that for pay-for-use is carried out in the case where the amount of data that can be used by the end-user is capped. However, another method may be employed instead, such as limiting the number of TCP connections only in the case where a monthly limit set by the end-user has been exceeded, inquiring with the user as to whether or not he or she is using a data amount cap setting, or the like. A method for using the pay-for-use determination process 900 will be described with reference to FIG. 10.

Figure 10:
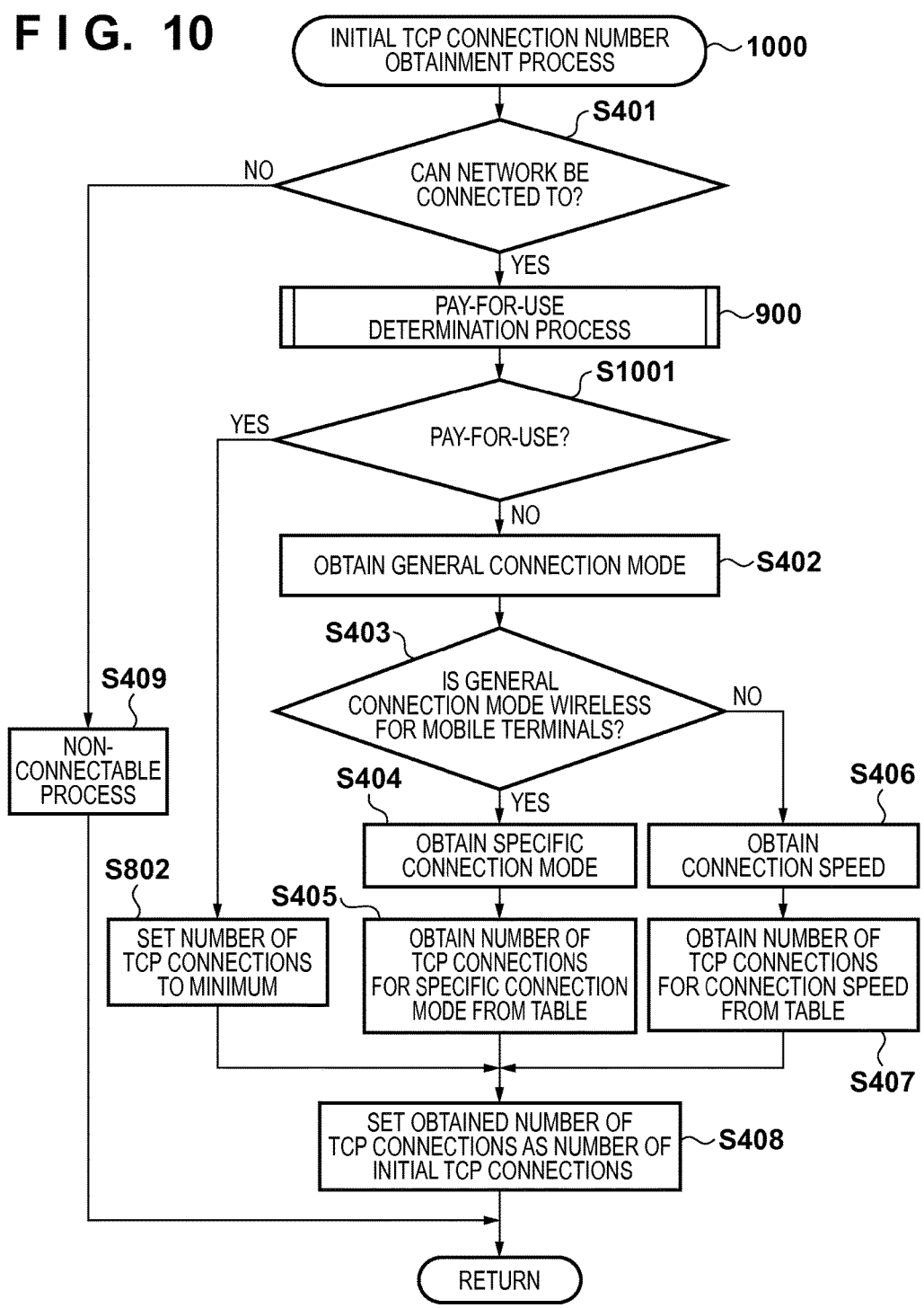
FIG. 10 is a flowchart illustrating a process for obtaining an initial number of TCP connections performed by a control unit using a pay-for-use determination process.

An initial TCP connection number obtainment process 1000 shown in FIG. 10 is an expanded version of the initial TCP connection number obtainment process 400 shown in FIG. 4. The same processes as those carried out in the initial TCP connection number obtainment process 400 have already been described in the first embodiment, and do not express characteristics of the present embodiment; details thereof will therefore be omitted. Furthermore, S802 has already been described in the second embodiment, and thus descriptions thereof will be omitted in the present embodiment. In the initial TCP connection number obtainment process 1000, after it has been determined in S401 whether or not the network can be connected to, it is then determined whether or not the communication is pay-for-use, using the pay-for-use determination process 900. The procedure moves to S802 if the control unit 301 determines in S1001 that the communication is pay-for-use, and moves to S402 if the control unit 301 determines that the communication is not pay-for-use.

According to the present embodiment as described thus far, it is determined whether or not the wireless information terminal is under a pay-for-use communication plan, and if the communication plan is pay-for-use, the usage cost for the end-user can be suppressed by limiting the number of TCP connections having taken into consideration the overhead for a plurality of TCP connections.

Fourth Embodiment

The first embodiment describes a method in which the control unit 301 determines the number of TCP connections based on the general connection mode and the specific connection mode. The following describes an embodiment that enables a more appropriate initial number of TCP connections to be determined based on whether or not a low-speed communication layer is used.

Figure 11:
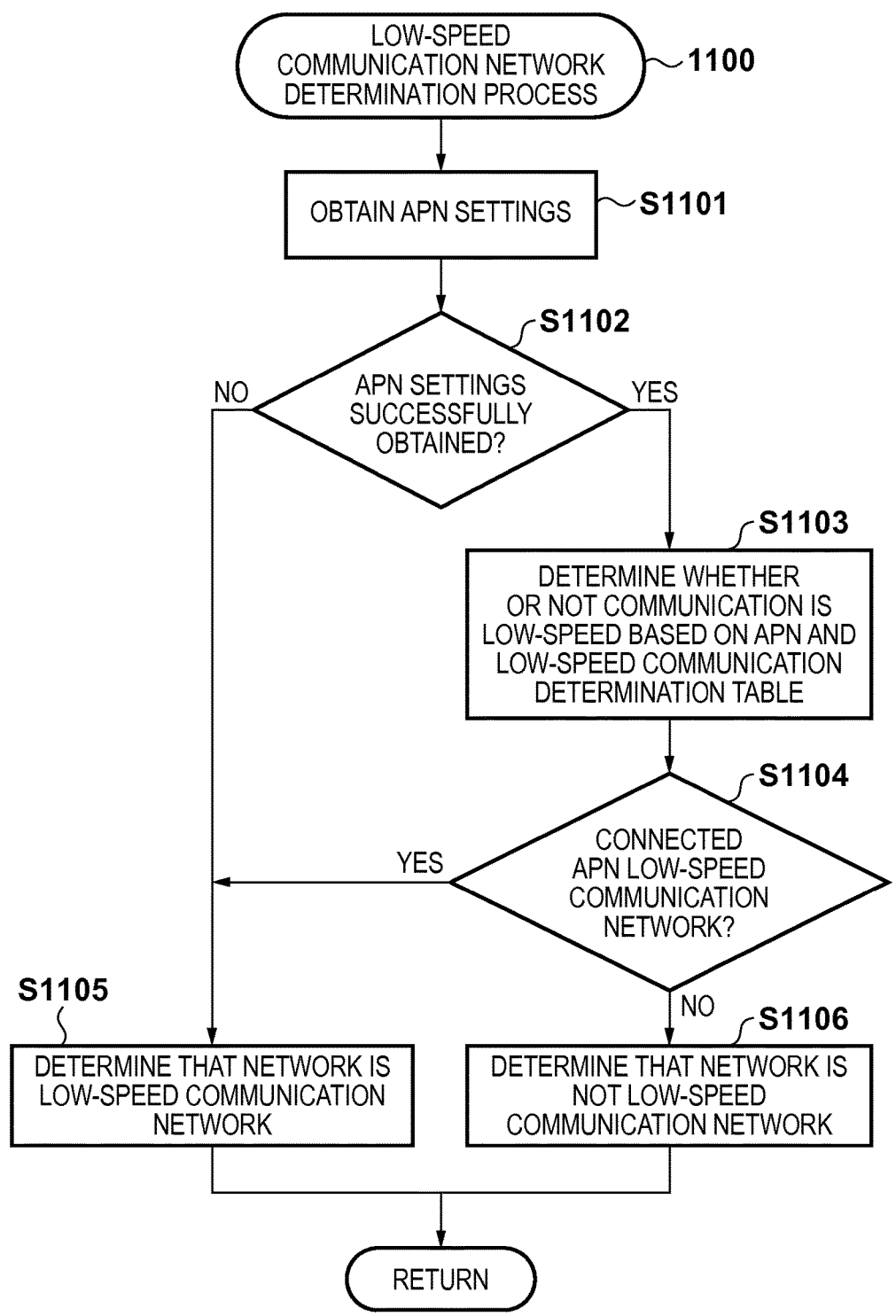
FIG. 11 is a flowchart illustrating a low-speed communication network determination process performed by a control unit.

Referring to FIG. 11, a method for determining an initial number of TCP connections based on whether or not a low-speed communication network is being employed according to the present embodiment will be described. The control unit 301 corrects and limits the initial number of TCP connections based on a low-speed communication network determination process 1100.

First, in S1101, the control unit 301 attempts to obtain an access point name (APN). An APN is configuration information specifying a connection destination, which is required by the wireless information terminal for data communication. In S1102, it is determined whether or not the APN has been successfully obtained, and the procedure moves to S1105 in the case where the APN has not been successfully obtained, where it is determined that the network is a low-speed communication network, after which the process ends. On the other hand, the procedure moves to S1103 in the case where the APN has been successfully obtained. In S1103, whether or not the network is a low-speed communication network is determined based on a low-speed communication determination table. The low-speed communication determination table is a list of APNs that limit the communication speed. In other words, the determination is carried out based on information of speeds associated with APNs. The low-speed communication determination table may be prepared in the wireless information terminal in advance, may be updated periodically over the Internet or the like, or the latest table may be obtained over the Internet or the like each time. In the case where the control unit 301 has determined in S1104 that the network is a low-speed communication network, the procedure moves to S1105, whereas in the case where it has been determined that the network is not a low-speed communication network, the procedure moves to S1106.

Figure 12:
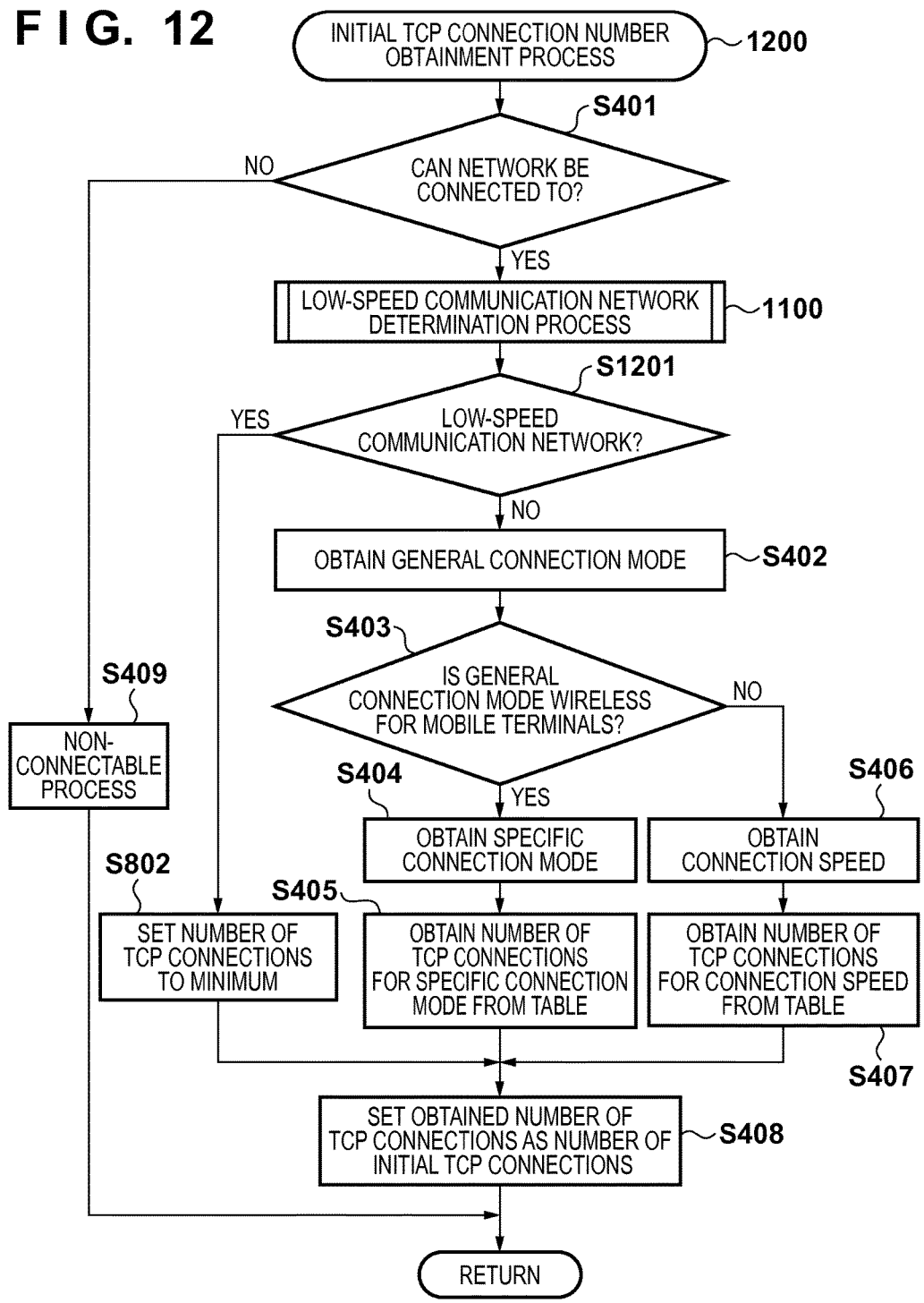
FIG. 12 is a flowchart illustrating a process for obtaining an initial number of TCP connections performed by a control unit using a low-speed communication network determination process.

A method for using the low-speed communication network determination process 1100 will be described with reference to FIG. 12. An initial TCP connection number obtainment process 1200 shown in FIG. 12 is an expanded version of the initial TCP connection number obtainment process 400 shown in FIG. 4. The same processes as those carried out in the initial TCP connection number obtainment process 400 have already been described in the first embodiment, and do not express characteristics of the present embodiment; details thereof will therefore be omitted. Furthermore, S802 has already been described in the second embodiment, and thus descriptions thereof will be omitted in the present embodiment. In the initial TCP connection number obtainment process 1200, after it has been determined in S401 whether or not the network can be connected to, it is then determined whether or not the network is a low-speed communication network, using the low-speed communication network determination process 1100. The procedure moves to S802 if the control unit 301 determines in S1201 that the network is a low-speed communication network, and moves to S402 if the control unit 301 determines that the network is not a low-speed communication network.

According to the present embodiment as described thus far, understanding whether or not the network is a low-speed communication network in advance makes it possible to limit the number of TCP connections, which in turn makes it possible to reduce the communication overhead for a plurality of TCP connections and maintain the communication speed.

Fifth Embodiment

The second, third, and fourth embodiments describe methods for determining a more appropriate initial number of TCP connections. Although these embodiments can be carried out independently, it is also possible to carry out these embodiments in combination with each other. Accordingly, the present embodiment describes a method that combines the second, third, and fourth embodiments.

Figure 13:
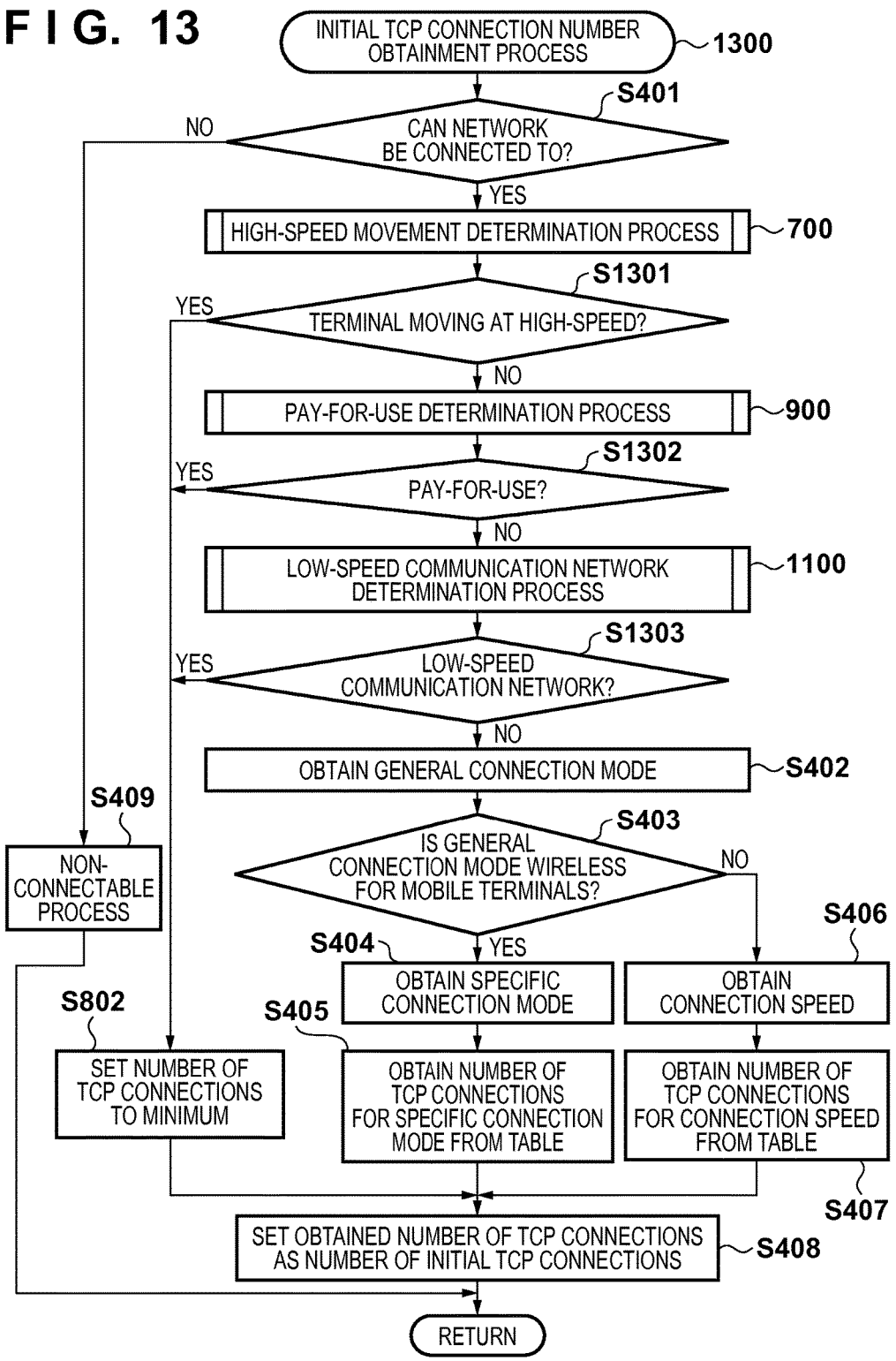
FIG. 13 is a flowchart illustrating an extended process for obtaining an initial number of TCP connections performed by a control unit.

A control flow according to the present embodiment will be described with reference to FIG. 13. An initial TCP connection number obtainment process 1300 shown in FIG. 13 is an expanded version of the initial TCP connection number obtainment process 400 shown in FIG. 4. The same processes as those carried out in the initial TCP connection number obtainment process 400 have already been described in the first embodiment, and do not express characteristics of the present embodiment; details thereof will therefore be omitted. Furthermore, S802 has already been described in the second embodiment, and thus descriptions thereof will be omitted in the present embodiment.

In the initial TCP connection number obtainment process 1300, it is determined in S401 whether or not a network can be connected to, after which it is checked whether a sufficient communication speed can be attained and whether communication using a plurality of TCP connections should be carried out in consideration of the overhead. First, the control unit 301 determines whether or not the terminal is moving at a high speed, in the high-speed movement determination process 700. In the case where the control unit 301 determines in S1301 that the terminal is moving at a high speed, the procedure moves to S802, whereas in the case where the terminal is not moving at a high speed, the checking is continued. In the pay-for-use determination process 900, the control unit 301 determines whether or not the contract for the current communication line is pay-for-use. In the case where the contract mode is pay-for-use in S1302, the procedure moves to S802, whereas in the case where the contract is not pay-for-use, the checking is continued.

Next, in a low-speed communication network determination process 1100, the control unit 301 determines whether or not the current communication line belongs to a low-speed communication network. In the case where the network is not a low-speed communication network in S1303, the procedure moves to S402. In the case where all of these checks have passed, the control unit 301 determines the number of TCP connections in accordance with the connection mode. Accordingly, communication is carried out without increasing the number of TCP connections in the case where it is determined that the effective usable bandwidth is low according to any of a plurality of determination standards.

In the present embodiment, whether or not communication using a plurality of TCP connections is effective is simply determined according to the aforementioned order. However, as another embodiment, the respective determination processes may be weighted, and it may then be determined to not carry out communication using a plurality of TCP connections only in the case where a total value of the weights exceeds a threshold. Alternatively, a method that allows a user him/herself to determine whether or not to use the respective determination processes to determine the effectiveness of communication using a plurality of TCP connections can be realized by presenting, to the user, an input screen (user interface screen) such as that shown in FIG. 14.

In FIG. 14, the procedure illustrated in FIG. 13 is executed when an "automatic high-speed communication control" checkbox is checked. In the case where this checkbox is not checked, it is assumed, for example, that the number of connections is fixed to a predetermined number such as 1, or that a number input by the user will be employed. In the case where the checkbox is checked, and a "communicate using fixed number of TCP connections" checkbox is further checked, the procedure illustrated in FIG. 13 is carried out only once. In the case where this checkbox is not checked, for example, the procedure illustrated in FIG. 13 is executed periodically, and the number of connections applied at that point in time is employed. Furthermore, 900 in FIG. 13 is executed only in the case where a "use pay-for-use information" checkbox is checked.

In the case where the pay-for-use determination process 900 is not executed, the result of the determination in S1302 is "no". Furthermore, the high-speed movement determination process 700 in FIG. 13 is executed only in the case where a "use high-speed movement information" checkbox is checked. In the case where the determination process 700 is not executed, the result of the determination in S1301 is "no". Furthermore, the low-speed communication network determination process 1100 in FIG. 13 is executed only in the case where a "use APN information" checkbox is checked. In the case where the determination process 1100 is not executed, the result of the determination in S1303 is "no". In this manner, only the determination standards that are checked in FIG. 14 are executed in the procedure shown in FIG. 13. This can be carried out for other embodiments as well. In this case, the determination standards not used in the respective embodiments need not be displayed in the user interface illustrated in FIG. 14. A method that allows the user him/herself to dynamically increase/decrease the number of TCP connections at the same time and using the same screen may be employed as well.

According to the present embodiment as described thus far, the effectiveness of communication using a plurality of TCP connections in a wireless communication network can be determined through a variety of methods. Because the optimal number of TCP connections can be determined, the user can effectively use the communication bandwidth and can control the communication method based on a provider contract and the like.

Other Embodiments

Embodiments of the present invention can also be realized by a computer of a system or apparatus that reads out and executes computer executable instructions recorded on a storage medium (e.g., non-transitory computer-readable storage medium) to perform the functions of the above-described embodiments of the present invention, and by a method performed by the computer of the system or apparatus by, for example, reading out and executing the computer executable instructions from the storage medium to perform the functions of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-165588, filed Aug. 8, 2013, which is hereby incorporated by reference herein in its entirety.

What is claimed is:

1. A mobile device having a phone function that establishes communication with a partner apparatus by carrying out wireless communication with a base station using one of a plurality of wireless communication standards, the device comprising:
   a processor; and
   a memory storing instructions, which when executed by the processor, causes the mobile device to:
      hold a correspondence table in which the plurality of wireless communication standards that can be used by the mobile device are associated with corresponding numbers of connections with the partner apparatus;
      specify a current wireless communication standard of the mobile device;
      determine the number of connections corresponding to the specified wireless communication standard, based on the correspondence table;
      provide a screen for inputting an instruction as to whether or not to use the number of connections corresponding to the determined wireless communication standard;
      carry out communication with the partner apparatus using the determined number of connections when an instruction to use the number of connections is input via the screen; and
      carry out communication with the partner apparatus using a predetermined number of connections when an instruction not to use the number of connections is input via the screen.

2. The mobile device according to claim 1, wherein if the specified wireless communication standard is a mobile telephone communication standard, the number of connections is determined to be a number determined in advance for each communication standard.

3. The mobile device according to claim 1, wherein if the specified wireless communication standard is not a mobile telephone communication standard, the number of connections is determined to be a number determined in advance based on a connection speed.

4. The mobile device according to claim 3, wherein the connection speed is a connection speed in a direction in which data is transferred.

5. The mobile device according to claim 1, wherein the execution of the instructions by the processor further causes the mobile device to determine whether or not the mobile device is moving at a speed, and if the mobile device is moving at a speed, the number of connections is determined to be a number that is lower than the number corresponding to the specified wireless communication standard.

6. The mobile device according to claim 5, wherein the mobile device is determined to be moving at a speed if a number of handovers occurring in a predetermined amount of time is greater than a predetermined number.

7. The mobile device according to claim 1, wherein the execution of the instructions by the processor further causes the mobile device to determine whether or not a network being connected to is a low-speed communication network, and if the network is a low-speed communication network, the number of connections is determined to be a number that is lower than the number corresponding to the specified communication standard.

8. The mobile device according to claim 7, wherein whether or not the network being connected to is a low-speed communication network is determined based on speed information associated with setting information specifying a connection destination leading to the partner apparatus.

9. The mobile device according to claim 1, wherein the execution of the instructions by the processor further causes the mobile device to obtain contract information indicating a contract mode for a fee charged to the mobile device, and if the contract mode is pay-for-use, determine the number of connections to be a number that is lower than the number corresponding to the specified wireless communication standard.

10. The mobile device according to claim 5, wherein the number that is lower than the number corresponding to the specified wireless communication standard is 1.

11. The mobile device according to claim 1, wherein the execution of the instructions by the processor further causes the mobile device to periodically determine the number of connections.

12. The mobile device according to claim 1, wherein inputting further instructions includes at least one of an instruction to determine the number of connections, an instruction to periodically determine the number of connections, an instruction to determine the number of connections in accordance with a contract mode, an instruction to determine the number of connections in accordance with whether or not the mobile device is moving at a speed, and an instruction to determine the number of connections in accordance with whether or not a network being connected to is a low-speed communication network are allowed via the screen.

13. A communication control method carried out by a mobile device having a phone function that establishes communication with a partner apparatus by carrying out wireless communication with a base station using one of a plurality of wireless communication standards, the method comprising:
   holding a correspondence table in which the plurality of wireless communication standards that can be used by the mobile device are associated with corresponding numbers of connections with the partner apparatus;
   specifying a current wireless communication standard of the mobile device;
   determining a number of connections corresponding to the wireless communication standard that has been specified, based on the correspondence table;
   providing a screen for inputting an instruction as to whether or not to use the number of connections corresponding to the determined wireless communication standard;
   carrying out communication with the partner apparatus using the determined number of connections when an instruction to use the number of connections is input via the screen; and
   carrying out communication with the partner apparatus using a predetermined number of connections when an instruction not to use the number of connections is input via the screen.

14. A non-transitory computer-readable medium having recorded therein a program for causing a computer to act as a mobile device having a phone function that establishes communication with a partner apparatus by carrying out wireless communication with a base station using one of a plurality of wireless communication standards, the program causing the computer to:
   hold a correspondence table in which the plurality of wireless communication standards that can be used by the mobile device are associated with corresponding numbers of connections with the partner apparatus;
   specify a current wireless communication standard of the mobile device;
   determine the number of connections corresponding to the specified wireless communication standard, based on the correspondence table;
   provide a screen for inputting an instruction as to whether or not to use the number of connections corresponding to the determined wireless communication standard;
   carry out communication with the partner apparatus using the determined number of connections when an instruction to use the number of connections is input via the screen; and
   carry out communication with the partner apparatus using a predetermined number of connections when an instruction not to use the number of connections is input via the screen.

* * * * *